(12) United States Patent
Alapuranen

(10) Patent No.: US 7,167,463 B2
(45) Date of Patent: Jan. 23, 2007

(54) SYSTEM AND METHOD FOR CREATING A SPECTRUM AGILE WIRELESS MULTI-HOPPING NETWORK

(75) Inventor: Pertti O. Alapuranen, Sanford, FL (US)

(73) Assignee: MeshNetworks, Inc., Maitland, FL (US)

( * ) Notice: Subject to any disclaimer, the term of this patent is extended or adjusted under 35 U.S.C. 154(b) by 59 days.

(21) Appl. No.: 10/959,336

(22) Filed: Oct. 7, 2004

(65) Prior Publication Data
US 2006/0077938 A1    Apr. 13, 2006

(51) Int. Cl.
*H04J 3/16* (2006.01)
*H04L 12/28* (2006.01)
*H04Q 7/00* (2006.01)
*H04Q 7/24* (2006.01)

(52) U.S. Cl. ............ 370/338; 370/329; 370/389; 370/437

(58) Field of Classification Search ........ 370/338–390, 370/432–459; 455/450–452; 375/132–141, 375/260
See application file for complete search history.

(56) References Cited

U.S. PATENT DOCUMENTS

| | | | |
|---|---|---|---|
| 4,494,192 A | 1/1985 | Lew et al. | |
| 4,617,656 A | 10/1986 | Kobayashi et al. | |
| 4,736,371 A | 4/1988 | Tejima et al. | |
| 4,742,357 A | 5/1988 | Rackley | |
| 4,747,130 A | 5/1988 | Ho | |
| 4,910,521 A | 3/1990 | Mellon | |
| 5,034,961 A | 7/1991 | Adams | |
| 5,068,916 A | 11/1991 | Harrison et al. | |
| 5,231,634 A | 7/1993 | Giles et al. | |
| 5,233,604 A | 8/1993 | Ahmadi et al. | |
| 5,241,542 A | 8/1993 | Natarajan et al. | |
| 5,287,384 A * | 2/1994 | Avery et al. ............ | 375/134 |
| 5,317,566 A | 5/1994 | Joshi | |
| 5,392,450 A | 2/1995 | Nossen | |
| 5,412,654 A | 5/1995 | Perkins | |
| 5,424,747 A | 6/1995 | Chazelas et al. | |
| 5,502,722 A | 3/1996 | Fulghum | |
| 5,517,491 A | 5/1996 | Nanni et al. | |
| 5,555,425 A | 9/1996 | Zeller et al. | |
| 5,555,540 A | 9/1996 | Radke | |

(Continued)

FOREIGN PATENT DOCUMENTS

CA    2132180    3/1996

(Continued)

OTHER PUBLICATIONS

Wong, et al., "Soft Handoffs in CDMA Mobile Systems," Dec. 1997, IEEE Personal Communications.

(Continued)

*Primary Examiner*—Man U. Phan
(74) *Attorney, Agent, or Firm*—Randi L. Karpinia; Joseph J. Buczynski

(57) ABSTRACT

A system and method for creating a spectrum agile wireless multi-hopping network, such as a wireless ad-hoc peer-to-peer multi-hopping network. The spectrum agile multi-hopping network that can respond to conditions affecting spectrum, such as FCC rulings or business related agreements on spectrum licensing related to a location or other measurable parameters of the network.

20 Claims, 2 Drawing Sheets

U.S. PATENT DOCUMENTS

| | | | |
|---|---|---|---|
| 5,572,528 A | 11/1996 | Shuen | |
| 5,615,212 A | 3/1997 | Ruszczyk et al. | |
| 5,618,045 A | 4/1997 | Kagan et al. | |
| 5,621,732 A | 4/1997 | Osawa | |
| 5,623,495 A | 4/1997 | Eng et al. | |
| 5,627,976 A | 5/1997 | McFarland et al. | |
| 5,631,897 A | 5/1997 | Pacheco et al. | |
| 5,644,576 A | 7/1997 | Bauchot et al. | |
| 5,652,751 A | 7/1997 | Sharony | |
| 5,680,392 A | 10/1997 | Semaan | |
| 5,684,794 A | 11/1997 | Lopez et al. | |
| 5,687,194 A | 11/1997 | Paneth et al. | |
| 5,696,903 A | 12/1997 | Mahany | |
| 5,701,294 A | 12/1997 | Ward et al. | |
| 5,706,428 A | 1/1998 | Boer et al. | |
| 5,717,689 A | 2/1998 | Ayanoglu | |
| 5,745,483 A | 4/1998 | Nakagawa et al. | |
| 5,774,876 A | 6/1998 | Wooley et al. | |
| 5,781,540 A | 7/1998 | Malcolm et al. | |
| 5,787,080 A | 7/1998 | Hulyalkar et al. | |
| 5,794,154 A | 8/1998 | Bar-On et al. | |
| 5,796,732 A | 8/1998 | Mazzola et al. | |
| 5,796,741 A | 8/1998 | Saito et al. | |
| 5,805,593 A | 9/1998 | Busche | |
| 5,805,842 A | 9/1998 | Nagaraj et al. | |
| 5,805,977 A | 9/1998 | Hill et al. | |
| 5,809,518 A | 9/1998 | Lee | |
| 5,822,309 A | 10/1998 | Ayanoglu et al. | |
| 5,844,905 A | 12/1998 | McKay et al. | |
| 5,845,097 A | 12/1998 | Kang et al. | |
| 5,857,084 A | 1/1999 | Klein | |
| 5,870,350 A | 2/1999 | Bertin et al. | |
| 5,877,724 A | 3/1999 | Davis | |
| 5,881,095 A | 3/1999 | Cadd | |
| 5,881,372 A | 3/1999 | Kruys | |
| 5,886,992 A | 3/1999 | Raatikainen et al. | |
| 5,887,022 A * | 3/1999 | Lee et al. | 375/132 |
| 5,896,561 A | 4/1999 | Schrader et al. | |
| 5,903,559 A | 5/1999 | Acharya et al. | |
| 5,909,651 A | 6/1999 | Chander et al. | |
| 5,936,953 A | 8/1999 | Simmons | |
| 5,943,322 A | 8/1999 | Mayor et al. | |
| 5,987,011 A | 11/1999 | Toh | |
| 5,987,033 A | 11/1999 | Boer et al. | |
| 5,991,279 A | 11/1999 | Haugli et al. | |
| 6,028,853 A | 2/2000 | Haartsen | |
| 6,029,217 A | 2/2000 | Arimilli et al. | |
| 6,034,542 A | 3/2000 | Ridgeway | |
| 6,044,062 A | 3/2000 | Brownrigg et al. | |
| 6,047,330 A | 4/2000 | Stracke, Jr. | |
| 6,052,594 A | 4/2000 | Chuang et al. | |
| 6,052,752 A | 4/2000 | Kwon | |
| 6,064,626 A | 5/2000 | Stevens | |
| 6,067,291 A | 5/2000 | Kamerman et al. | |
| 6,067,297 A | 5/2000 | Beach | |
| 6,078,566 A | 6/2000 | Kikinis | |
| 6,104,712 A | 8/2000 | Robert et al. | |
| 6,108,738 A | 8/2000 | Chambers et al. | |
| 6,115,580 A | 9/2000 | Chuprun et al. | |
| 6,122,690 A | 9/2000 | Nannetti et al. | |
| 6,130,881 A | 10/2000 | Stiller et al. | |
| 6,132,306 A | 10/2000 | Trompower | |
| 6,147,975 A | 11/2000 | Bowman-Amuah | |
| 6,163,699 A | 12/2000 | Naor et al. | |
| 6,178,337 B1 | 1/2001 | Spartz et al. | |
| 6,192,053 B1 | 2/2001 | Angelico et al. | |
| 6,192,230 B1 | 2/2001 | Van Bokhorst et al. | |
| 6,208,870 B1 | 3/2001 | Lorello et al. | |
| 6,222,463 B1 | 4/2001 | Rai | |
| 6,222,504 B1 | 4/2001 | Oby | |
| 6,223,240 B1 | 4/2001 | Odenwald et al. | |
| 6,240,294 B1 | 5/2001 | Hamilton et al. | |
| 6,246,875 B1 | 6/2001 | Seazholtz et al. | |
| 6,249,516 B1 | 6/2001 | Brownrigg et al. | |
| 6,275,707 B1 | 8/2001 | Reed et al. | |
| 6,285,892 B1 | 9/2001 | Hulyalkar | |
| 6,304,556 B1 | 10/2001 | Haas | |
| 6,327,300 B1 | 12/2001 | Souissi et al. | |
| 6,349,091 B1 | 2/2002 | Li | |
| 6,349,210 B1 | 2/2002 | Li | |
| 6,359,872 B1 | 3/2002 | Mahany et al. | |
| 6,366,568 B1 | 4/2002 | Bolgiano et al. | |
| 6,405,049 B2 | 6/2002 | Herrod et al. | |
| 6,594,302 B1 * | 7/2003 | Lansford | 375/133 |
| 6,907,228 B1 * | 6/2005 | Lohtia et al. | 455/62 |
| 7,016,395 B2 * | 3/2006 | Watanabe et al. | 375/132 |
| 2001/0053699 A1 | 12/2001 | McCrady et al. | |
| 2002/0013856 A1 | 1/2002 | Garcia-Luna-Aceves | |
| 2003/0050070 A1 * | 3/2003 | Mashinsky et al. | 455/452 |
| 2003/0202494 A1 * | 10/2003 | Drews et al. | 370/338 |
| 2004/0087310 A1 * | 5/2004 | Williamson et al. | 455/450 |
| 2005/0250468 A1 * | 11/2005 | Lu et al. | 455/403 |
| 2006/0063543 A1 * | 3/2006 | Matoba et al. | 455/509 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms," Jul. 2000, IEEE Journal on Selected Areas in Communications, vol. 18, No. 7.

Andras G. Valko, "Cellular IP: A New Approach to Internet Host Mobility," Jan. 1999, ACM Computer Communication Review.

Richard North, Dale Bryan and Dennis Baker, "Wireless Networked Radios: Comparison of Military, Commercial and R&D Protocols," Feb. 28-Mar. 3, 1999, 2nd Annual UCSD Conference on Wireless Communications, San Diego, CA.

Benjamin B. Peterson, Chris Kmiecik, Richard Hartnett, Patrick M. Thompson, Jose Mendoza and Hung Nguyen, "Spread Spectrum Indoor Geolocation," Aug. 1998, Navigation: Journal of the Institute of Navigation, vol. 45, No. 2, Summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols," Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Self-Healing Wireless Networks," 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol," August 1999, IEEE Journal on Selected Areas in Communications, vol. 17, No. 8.

Ad Kamerman and Guido Aben, "Net Throughput with IEEE 802.11 Wireless LANs".

J. R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks Using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenya Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

SYSTEM AND METHOD FOR CREATING A SPECTRUM AGILE WIRELESS MULTI-HOPPING NETWORK

BACKGROUND OF THE INVENTION

1. Field of the Invention

The present invention relates to a system and method for creating a spectrum agile wireless multi-hopping network, such as a wireless ad-hoc peer-to-peer multi-hopping network. More particularly, the present invention relates to a system and method for creating a spectrum agile multi-hopping network that can respond to conditions affecting spectrum, such as FCC rulings or business related agreements on spectrum licensing related to a location or other measurable parameters of the network.

2. Description of the Related Art

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at a first node to communicate simultaneously with several other nodes in its coverage area.

In recent years, a type of mobile communications network known as an "ad-hoc" network has been developed. In this type of network, each mobile node is capable of operating as a base station or router for the other mobile nodes, thus eliminating the need for a fixed infrastructure of base stations.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", granted on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", granted on Oct. 19, 2004, and in U.S. Pat. No. 6,873,839 entitled "Prioritized-Routing for an Ad-Hoc, Peer-to-Peer, Mobile Radio Access System", granted on Mar. 29, 2005, the entire content of each being incorporated herein by reference.

As can be appreciated from the nature of wireless mobile communication networks such as those discussed above, it is desirable for the radios or nodes of the network to be spectrum agile or, in other words, be capable of operating at different radio frequency spectrums. Spectrum agility is particularly important when spectrum licensing is tied to location coordinates. For example, some frequency spectrum may be available in one town while not available for use in other. Additionally, a certain frequency spectrum may be available only during certain times of day or may be not available due to licensing agreements. This situation can happen if licensed spectrum is dedicated for certain use, for example, for emergency use but can be licensed during non emergency times for commercial use.

Accordingly, a need exists for a system and method that enables a wireless communication network to be spectrum agile.

SUMMARY OF THE INVENTION

The present invention thus provides a system and method for creating a spectrum agile wireless multi-hopping network, such as a wireless ad-hoc peer-to-peer multi-hopping network. The multi-hopping network can respond to conditions affecting spectrum, such as FCC rulings or business related agreements on spectrum licensing related to a location or other measurable parameters of the network.

The system and method employs the operations of storing information pertaining to respective spectrum availability based on respective conditions, and providing the spectrum availability information to the nodes of the network, such as stationary or mobile nodes of a multi-hopping wireless ad-hoc peer-to-peer network, so that the nodes can communicate over one of the frequency spectrums indicated by the spectrum availability information when a respective condition exists, and so that the nodes can communicate over another one of the frequency spectrums indicated by the spectrum availability information when another respective condition exists. The spectrum availability information can be provided to the nodes via a beacon signal received by the nodes within the broadcast range of the source transmitting the beacon signal.

The spectrum availability information includes at least one of the following: available spectrum bands; power levels for the bands; location where bands are available; cost of using the frequency bands; the traffic for which the bands can be used; time interval for license update time limits for using the bands; and transmission power. Each node stores a portion of the spectrum availability information. The respective conditions which govern the spectrum that the nodes use include at least one of the following: location of a node; time of day; power limit; spectrum; cost; and bandwidth.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
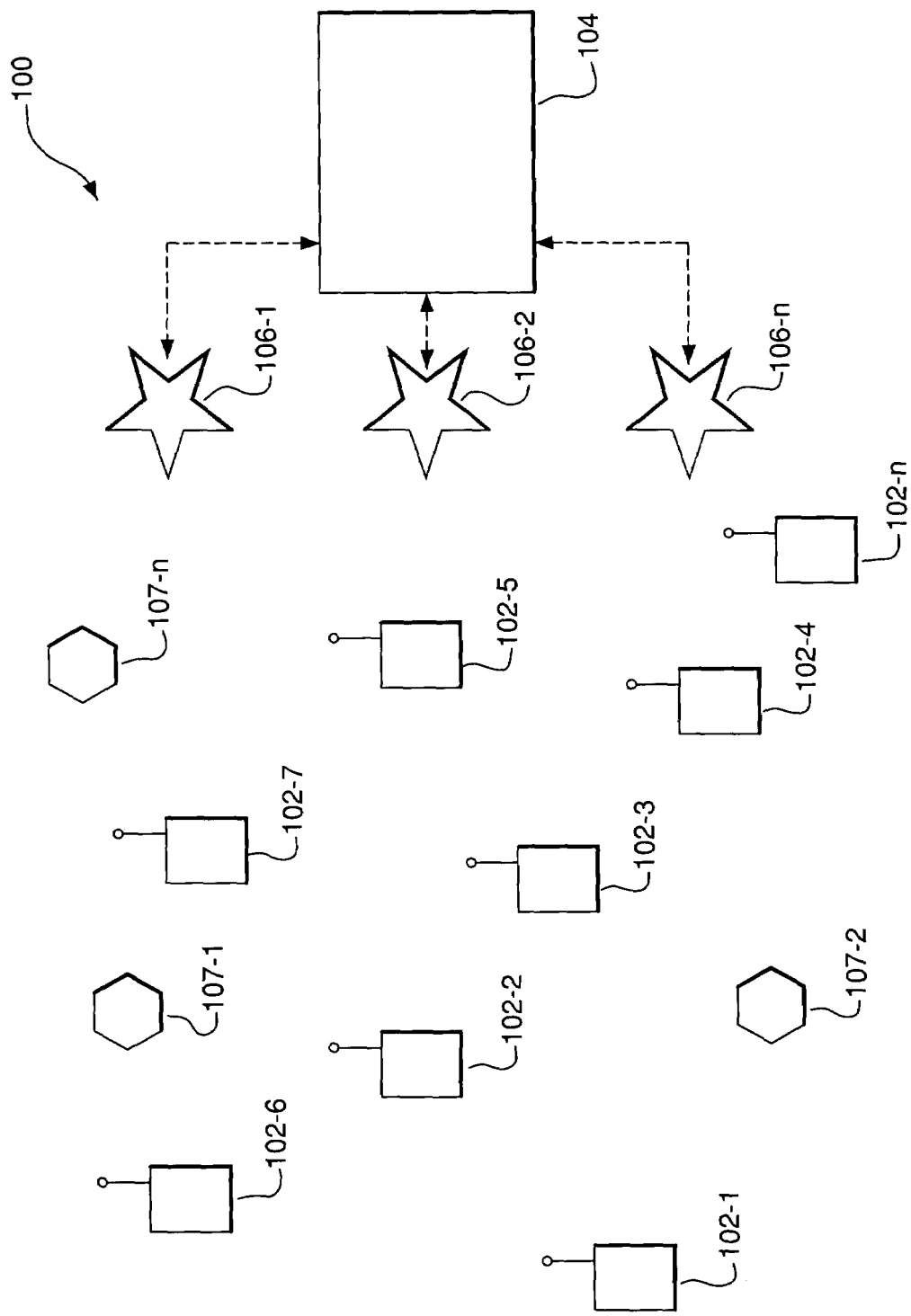
FIG. 1 is a block diagram of an example ad-hoc wireless communications network including a plurality of nodes employing a system and method in accordance with an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. Nos. 7,072,650, 6,807,165, and 6,873,839 referenced above.

Figure 2:
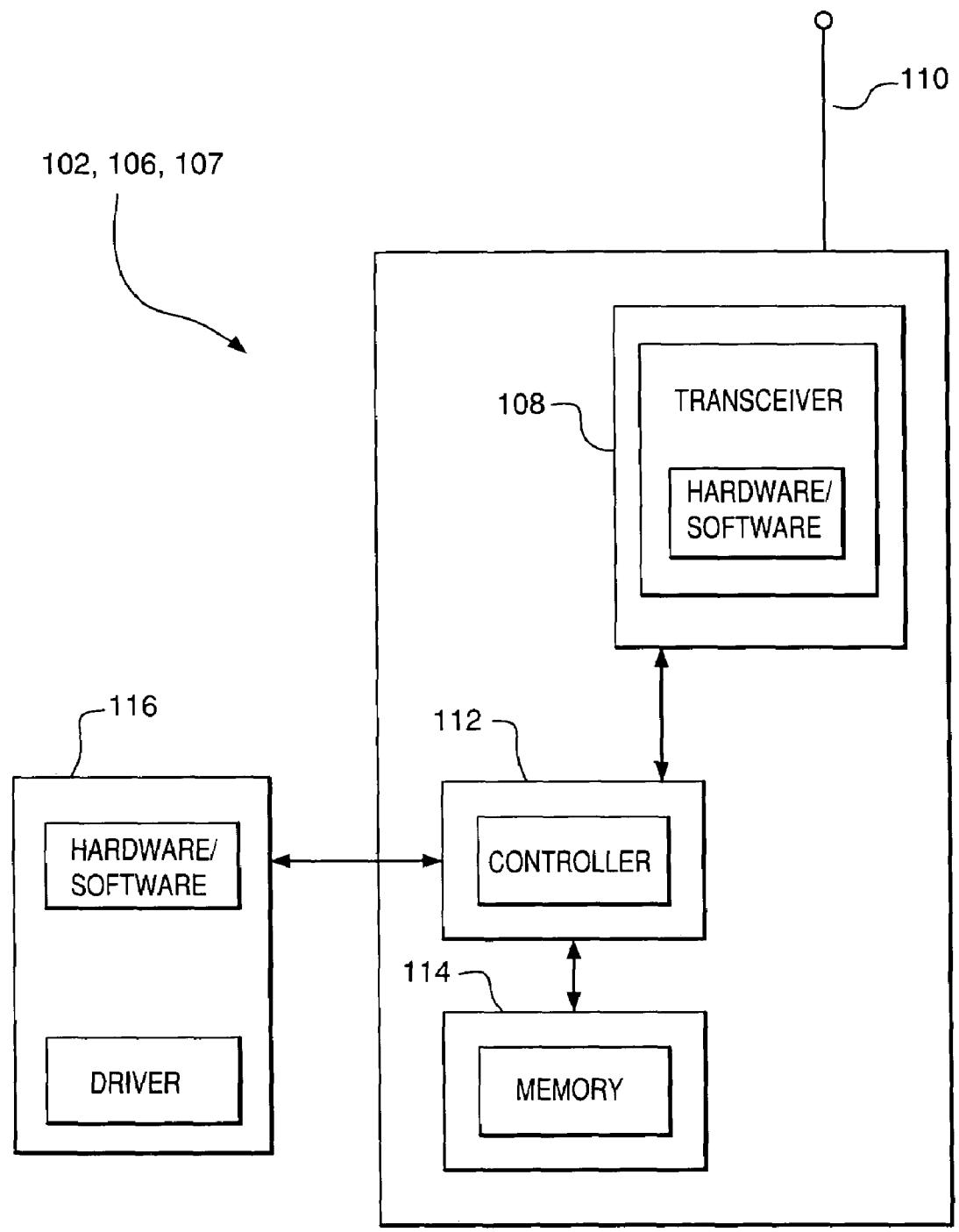
FIG. 2 is a block diagram illustrating an example of a mobile node employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

As discussed above, it is desirable for the radios or nodes 102, 106 and 107 of the network 100 to be spectrum agile or, in other words, be capable of operating at different radio frequency spectrums. As will now be described, an embodiment of the present invention enables the network 100 to be spectrum agile to respond to limits on spectrum that can occur due to, for example, FCC rulings or business related agreements on spectrum licensing related to a location or other measurable parameters of a system. The location can be determined by GEO coordinates, latitude and longitude, or the relative radial distance from a node to another node, such as an IAP (Intelligent Access Point).

As discussed above, the nodes 102, 106 and 107 of wireless multi-hopping network 100 communicate with fixed infrastructure such as core LAN 104 and/or with other mobile or fixed nodes 102, 106 or 107. A method for informing spectrum usage rules to nodes in a multi-hopping network such as network 100 may require that each node is able to compute information that can be used as a key for accessing a database that contains the rules for spectrum usage. These rules can contain one or more of the following: available spectrum (bands), which can be frequency and bandwidths; power levels for the bands; location where bands are available; cost of using the frequency bands; the traffic for which the bands can be used; time interval for license update time limits for using the bands; or power or any other parameter that has a time attribute. The key to the database can be one or more of the following: GEO location; time of day; power limit; spectrum (frequency band); cost; and bandwidth.

Information pertaining to these rules and keys can be stored in a distributed or centralized database. For example, the memory 114 of each IAP 106 can contain a copy of a database that is relevant for the region where the IAP 106 is located. Also, the memory 114 of certain nodes 102 or 107 can also contain a copy of the database that is relevant for the respective regions where the nodes 102 and 107 are present. For example, the database may contain information of licensed bands that can be used and how often the license data has to be updated for the use. For example, if the 4.9 GHz band is licensed for commercial use during non-emergency times, then the expiration time for a commercial license can be only minutes so that every node 102 and 107 has to access the database of the IAP 106 with which it is associated to see if an emergency situation is occurring.

Alternatively, the cost of using the band can be related to commercial licensing agreements. For example, although the network 100 can use the band for communication, there is a data volume dependent cost that has to be paid to the actual owner of the spectrum. This rule allows the nodes 102, 106 and 107 to avoid costly spectrum that can be also capacity limited.

The GEO location information can be used to access the database so that a node, such as a mobile node 102, can verify if it is allowed to use a certain frequency in its current location. The GEO location information may be actual (x,y,z) coordinates, longitude and latitude, or simply a radial distance from a base station (e.g., an IAP 106) or a cell site. This allows for use of the spectrum in area where some sensitive equipment is using the same band. For example, the node 102 would not be permitted to use a certain spectrum near military or other sensitive installations where the communication by the node 102 might interfere with communication equipment at those installations.

As can be further appreciated by one skilled in the art, a multi-hopping network such as network 100 has additional problems in accessing the database since some devices, such as mobile nodes 102, may have no direct connection to server that provides the information. Also, efficient distribution of the information has to occur in order for the nodes 102 to be aware of the spectrum that they are able to use.

One technique according to an embodiment of the present invention for providing efficient distribution of the information is to include information pertaining to the availability and accessibility of the information related to spectrum rules in a beacon signal that can be transmitted, for example, by an LAP 106. The beacon signal is broadcast to some neighborhood of nodes 102 with preset power to cover a desired area. The beacon signal can include information identifying the availability of the band that a node, such as a mobile node 102, can access to obtain the rule information, or information about the availability of the band. If mobile node 102 can receive this beacon signal, the mobile node 102 thus knows that the band over which the beacon signal was sent is available, and by decoding the information in the beacon signal the node 102 can determine for what use the band is available. Alternatively, the information related to spectrum rules can be distributed to the nodes (e.g., nodes 102 and 107) via a broadcast flood as can be appreciated by one skilled in the art.

In addition, in a multi hopping network 100, the beacon can be used to enable nodes, such as mobile nodes 102 or wireless routers 107, to indicate the availability of the rule data to other neighboring nodes 102 or 107. This capability is beneficial because, as discussed above, a node 102 or 107 may have to access the server through multiple hops. Each mobile node 102 and router 107 in the network 100 can thus contain a relevant piece of the database in its memory 114 and can share it with its neighboring nodes via, for example, routing advertisements or other messages. The authentication of this information can be done using a shared secret model, that is, the confidential information is preprogrammed into the memory 114 of each node 102, 106 and 107. The authentication process is used to confirm that the data is valid. Such authentication methods used by the network 100 can include the use of symmetric or asymmetric keys. A symmetric key system is an encryption system in which the sender and receiver of a message share a single, common key that is used to encrypt and decrypt the message. Asymmetric or public-key cryptography differs from conventional cryptography in that key material is bound to a single user. The key material is divided into two components: a private key, to which only the user has access, and a public key, which may be published or distributed on request.

Furthermore, the cost associated to spectrum information can be used also to avoid using resources that are financially expensive to the user, operator or some other entity. Additionally, a fast spectrum license revocation technique can be performed using a beacon signal or by flooding a data packet indicating resource revocation through the network 100 as soon as one node 102, 106 or 107 receives information about the revocation. For example, if one node (e.g., a node 102) receives revocation information from an IAP 106, for example, the node 102 propagates this revocation information through the network 100 using a data packet flood or beacon signal. This ability is useful, for example, in emergency situations when the purpose of the spectrum usage changes abruptly.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for creating a spectrum agile wireless multi-hopping network including a plurality of nodes communicating with each other within the wireless multi-hopping network, the method comprising:
   within at least one of the plurality of nodes:
   receiving and storing one or more spectrum availability information associated with one or more conditions; and
   providing the spectrum availability information to the one or more neighboring nodes so that the one or more neighboring nodes can communicate over one or more frequency spectrums indicated by the spectrum availability information when a first condition exists, and so that the one or more neighboring nodes can communicate over another one or more frequency spectrums indicated by the spectrum availability information when a second condition exists.

2. A method as claimed in claim 1, wherein:
   the providing step provides the spectrum availability information to the one or more neighboring nodes via a beacon signal received by the one or more neighboring nodes within the broadcast range of the at least one of the plurality of nodes.

3. A method as claimed in claim 2, further comprising prior to the providing step:
   operating the at least one of the plurality of nodes as an access point to enable the one or more neighboring nodes to access a portion of the spectrum agile wireless multi-hopping network or another different network.

4. A method as claimed in claim 1, wherein:
   the spectrum availability information includes at least one of the following: available spectrum bands; power levels for the bands; location where bands are available; cost of using the frequency bands; the traffic for which the bands can be used; time interval for license update time limits for using the bands; and transmission power.

5. A method as claimed in claim 1, further comprising:
   storing a portion of the spectrum availability information within at least one of the one or more neighboring nodes.

6. A method as claimed in claim 5, further comprising:
   operating the at least one of the one or more neighboring nodes as an access point node which operates to enable at least one other of the plurality of nodes to access a portion of the spectrum agile wireless multi-hopping network or another different network.

7. A method as claimed in claim 1, wherein:
   the respective conditions include at least one of the following: location of a node; time of day; power limit; spectrum; cost; and bandwidth.

8. A method as claimed in claim 1, wherein:
   the network is a wireless ad-hoc peer-to-peer communication network.

9. A method as claimed in claim 1, wherein:
   one or more of the plurality of nodes are mobile nodes.

10. A method as claimed in claim 1, wherein:
    the providing step provides the spectrum availability information to the one or more neighboring nodes via a broadcast flood received by the one or more neighboring nodes.

11. A spectrum agile wireless multi-hopping network, comprising:
    a plurality of nodes, adapted to communicate with each other within the wireless multi-hopping network, at least one of the plurality of nodes being adapted to receive and store one or more spectrum availability information associated with one or more conditions; and
    the at least one of the plurality of nodes being further adapted to provide the spectrum availability information to one or more neighboring nodes so that the one or more neighboring nodes can communicate over one of one or more frequency spectrums indicated by the spectrum availability information when a first condition exists, and so that the one or more neighboring nodes can communicate over another one or more frequency spectrums indicated by the spectrum availability information when a second condition exists.

12. A network as claimed in claim 11, further comprising:
a source for providing the spectrum availability information to the at least one of the nodes via a beacon signal received by the nodes within the broadcast range of the source transmitting the beacon signal.

13. A network as claimed in claim 12, wherein:
the at least one of the plurality of nodes further is adapted to operate as an access point to enable the one or more neighboring nodes to access a portion of the spectrum agile wireless multi-hopping network or another different network.

14. A network as claimed in claim 11, wherein:
the spectrum availability information includes at least one of the following: available spectrum bands; power levels for the bands; location where bands are available; cost of using the frequency bands; the traffic for which the bands can be used; time interval for license update time limits for using the bands; and transmission power.

15. A network as claimed in claim 11, wherein:
one or more of the plurality of nodes is adapted to store a portion of the spectrum availability information.

16. A network as claimed in claim 15, wherein:
the one or more of the plurality of nodes are access point nodes which enable the nodes to access a portion of the spectrum agile wireless multi-hopping network or another different network.

17. A network as claimed in claim 11, wherein:
the respective conditions include at least one of the following: location of a node; time of day; power limit; spectrum; cost; and bandwidth.

18. A network as claimed in claim 11, wherein:
the network is a wireless ad-hoc peer-to-peer communication network, and the plurality of nodes communicate with each other in the wireless ad-hoc peer-to-peer communication network.

19. A network as claimed in claim 11, wherein:
one or more of the plurality of nodes are mobile nodes.

20. A network as claimed in claim 11, wherein:
the at least one of the plurality of nodes provides the spectrum availability information to the one or more neighboring nodes via a broadcast flood received by the one or more neighboring nodes.

* * * * *